United States Patent [19]

Cheng et al.

[11] Patent Number: 4,809,519
[45] Date of Patent: Mar. 7, 1989

[54] METHODS AND APPARATUSES FOR CONDUCTING SOLID-LIQUID-VAPOR MULTIPLE PHASE TRANSFORMATION OPERATIONS

[76] Inventors: Chen-Yen Cheng; Sing-Wang Cheng; Wu-Cheh Cheng, all of 9605 La Playa St. NE., Albuquerque, N. Mex. 87111

[21] Appl. No.: 177,668

[22] Filed: Apr. 18, 1988

[51] Int. Cl.$^4$ ............................ B01D 9/04; C02F 1/22
[52] U.S. Cl. ............................................ 62/545; 62/123
[58] Field of Search .................. 62/12, 544, 545, 532, 62/123

[56] References Cited

U.S. PATENT DOCUMENTS

| | | | |
|---|---|---|---|
| 2,890,239 | 6/1959 | Quigg | 62/545 |
| 3,529,938 | 9/1970 | Yoon et al. | 62/545 |
| 3,801,285 | 4/1974 | Meisenburg et al. | 62/545 |
| 4,332,140 | 6/1982 | Thijssen et al. | 62/545 |
| 4,578,093 | 3/1986 | Cheng et al. | 62/532 |
| 4,654,064 | 3/1987 | Cheng et al. | 62/532 |

*Primary Examiner*—Ronald C. Capossela

[57] ABSTRACT

The invention is a method with equipments for conducting the solid-liquid-vapor multiple phase transformation steps of processes such as vacuum freezing, wet distillative freezing, vacuum crystallization and primary refrigerant eutectic freezing. All these processes require simultaneous vaporization and crystallization. The invented method for conducting this common step consists of (1) distributing the solution over a rotating surface area to form liquid films (2) subjecting the liquid films to simultaneous vaporization and crystallization (3) removing the crystals from the surfaces and (4) transporting the crystals to the next processing zone. The surfaces can be rotating screws with intermeshing flights or a sets of disks on rotating shafts. The screws are partially submerged in the solution. Elements of the screws are wetted when they are rotated into the pool. Vaporization and crystallization occur when the screw elements are rotated out of the pool because the vessel is maintained at a pressure below the multiple phase—that is solid-liquid-vapor—equilibrium pressure of the solution. The crystals either dislodge from the elements when the elements re-enter the pool or they build up to a certain thickness and are then rubbed off by the crystal buildup on the intermeshing screw. Whether the crystals float or sink, they are conveyed by the screws to the next processing zone. Disk arrangements can be used just like the screws. However, a separate conveying screw is needed to transport the crystals.

36 Claims, 3 Drawing Sheets

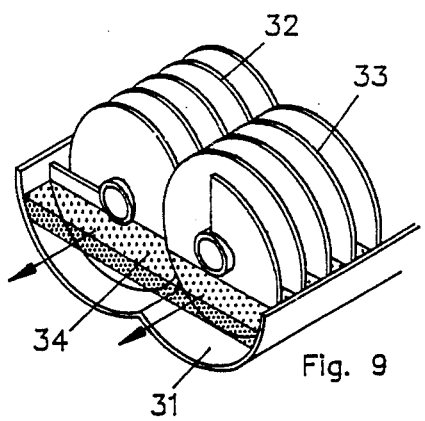
Fig. 9
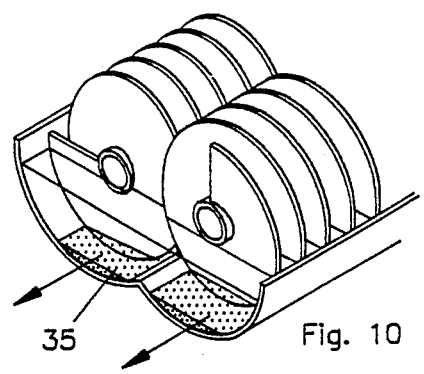
Fig. 10
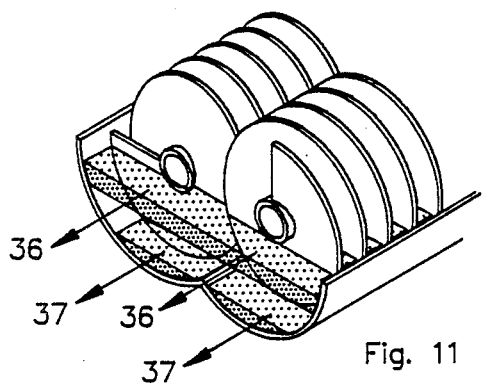
Fig. 11
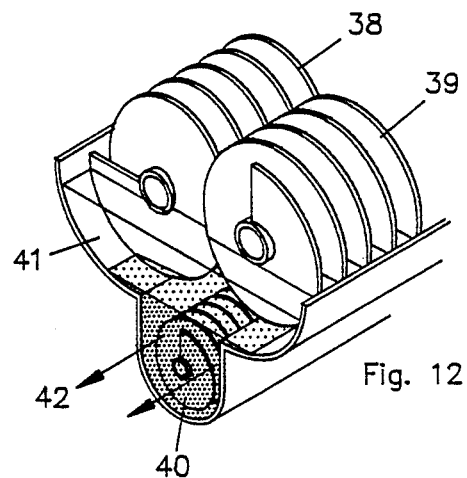
Fig. 12
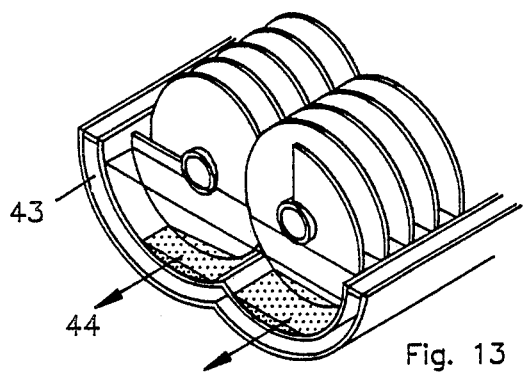
Fig. 13
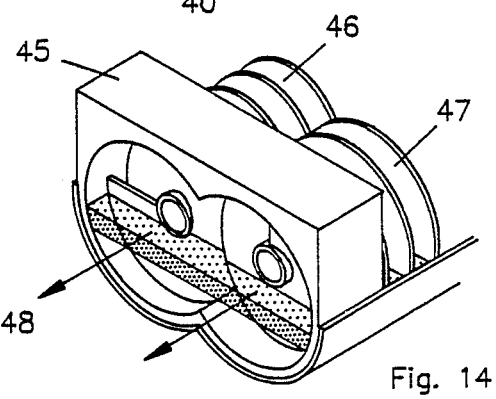
Fig. 14
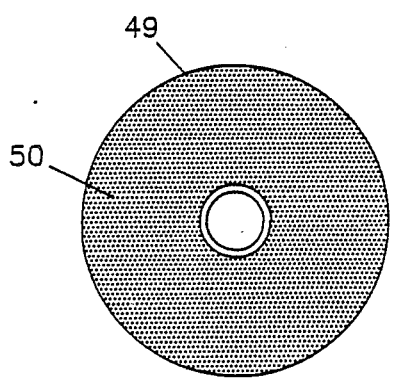
Fig. 15
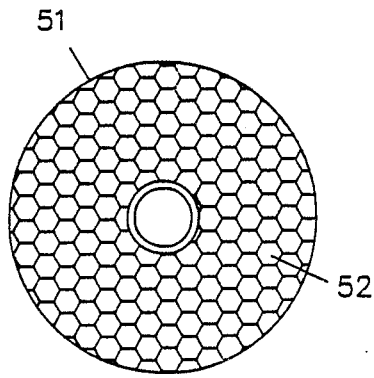
Fig. 16-a
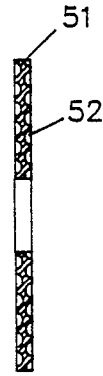
Fig. 16-b

METHODS AND APPARATUSES FOR CONDUCTING SOLID-LIQUID-VAPOR MULTIPLE PHASE TRANSFORMATION OPERATIONS

BACKGROUND OF THE INVENTION

1. Field of the Invention

A solid-liquid-vapor (S/L/V) multiple phase transformation refer to simultaneous vaporizaton and solidification operations in which a mass of liquid is simultaneously partially vaporized and partially solidified to thereby form a first vapor and a mass of solid, which may be a mass of solvent solid, a mass of solute solid or a mixed mass of solvent solid and solute solid. S/L/V multiple phase transformations are involved in such processes as (a) Vacuum Freezing Processes, (b) Primary Refrigerant Eutectic Freezing Process, (c) Distillative Freezing Processes, and (d) Vacuum Crystallization Processes. The methods and apparatuses of the present invention are used to conduct such S/L/V transformations and have the following advantages over the conventional ways of conducting the S/L/V transformations:

(a) The equipment used is simple and can be easily scaled up
(b) The energy input required is greatly reduced
(c) The crystals formed are larger and can be washed more easily
(d) The transport of the mass of crystals is readily accomplished
(e) In the eutectice freezing operation, the masses of solvent and solute crystals formed can be separated

2. Brief Description of the Prior Art

The methods and apparatuses of the present invention are to be used in conducting solid-liquid-vapor multiple phase transformation operations (S/L/V transformation) in (a) Vacuum Freezing Processes, (b) Primary Refrigerant Eutectic Freezing Processes, (c) Distillative Freezing Processes and (d) Vacuum Crystallization Processes. An S/L/V transformation refers to simultaneous vaporization and solidification operations of a mass of liquid to thereby form a first vapor and form a mass of solid which may be a mass of solvent crystals, a mass of solute crystals, or a mixed mass of solvent and solute crystals. References to these processes are presented and the conventional methods used in accomplishing the S/L/V transformations in these processes are outlined.

2A. Vacuum Freezing Processes

A vacuum freezing processes can be used in the separation of both aqueous and non-aqueous solutions. Many vacuum freezing processes have been introduced by workers in the desalination field. Some of these processes have been tested only in bench scale units and only a few have been tested in pilot plant scale operations.

Referring to the processing of an aqueous solution by any vacuum freezing process, the aqueous solution is introduced into a chamber which is maintained at a pressure that is somewhat lower than the vapor pressure of the solution at the freezing temperature of the solution to thereby simultaneously flash vaporize water and form ice crystals. This operation is referred to as the S/L/V transformation in a vacuum freezing process. As the result of this operation, a low pressure water vapor, referred to as a first vapor, and an ice-mother liquour slurry, referred to as a first condensed mass, are formed. In the case of sea water desalination, this pressure is around 3.5 Torr. The low pressure water vapor formed has to be removed and transformed into a condensed slate; the ice crystals have to be separated from the mother liquor and the resulting purified ice has to be melted to yield fresh water. Furthermore, the heat released in transforming the vapor into a condensed state has to be utilized in supplying the heat needed in melting the ice. The processes to be described utilize different ways of vapor removal and different ways of accomplishing the heat reuse.

A sub-triple point vapor is defined as a vapor whose pressure is lower than the triple point pressure of its major component. Sub-triple point vapor desublimes to form a solvent solid upon a constant pressure cooling and the desublimation tempertaure is lower than the normal melting temperature of the solvent solid. When a sub-triple point vapor mixture is cooled, it may undergo a mixed condensation operation by partially condensing into liquid and partially condensing into solid at a temperature that is also lower then the melting temperature of the solvent solid. Therefore, the heat released in the desublimation operation or a mixed condensation operation of a sub-triple point vapor or vapor mixture cannot be used in supplying the heat needed in melting a mass of the purified solid of the major component. Conversely, a super-triple point vapor is defined as a vapor whose pressure is higher than the triple point pressure of its major component. A super-triple point vapor condenses to form a solvent liquid upon a constant pressure cooling and the condensing temperature is higher than the normal melting temperature of the solvent solid. Therefore, the heat released in condensing a super-triple point vapor can be used in supplying the heat needed in melting a mass of the purified solid of the major component.

References to the vacuum freezing processes that have been introduced are given as follows:

(1) Vacuum Freezing Vapor Compression (VFVC) Process:

This process was developed by Colt Industries and is described in the Office of Saline Water, Research and Development Report No. 295.

(2) Vacuum Freezing Vapor Absorption (VFVA) Process: This process was developed by Carrier Corporation and is described in the Office of Saline Water, Research and Development Report No. 113.

(3) Vacuum Freezing Ejector Absorption (VFEA) Process: This process was developed by Colt Industries and is described in the Office of Saline Water, Research and Development Report No. 744.

(4) Absorption Freezing Vapor Compression (AFVC) Process:

This process was introduced by Concentration Specialists, Inc., Andover, Mass. and is described in the reports submitted to the Office Water Research and Technology, Department of Interior on May 1981 and January 1982. No journal publication seems to be available.

(5) Vacuum-Freezing Vapor-Freezing (VFVF) Process: This process was introduced by Ralph E. Peck and is described in U.S. Pat. No. 3,714,791.

(6) Vacuum Freezing Multiple Phase Transformation (VFMPT) Process:

This process was introduced by Chen-Yen Cheng and Sing-Wang Cheng and is described in U.S. Pat. Nos. 4,420,318 and 4,505,728.

(7) Vacuum Freezing Solid Condensation (VFSC) Process: This process was introduced by H. M. Curran and C. P. Howard of Catholic University of America and is described in the Office of Saline Water, Research and Development Report No. 511.

(8) Vacuum Freezing High-Pressure Ice-Melting (VFPIM) Process:

This process was introduced by Chen-Yen Cheng and Sing-Wang Cheng and is described in U.S. Pat. No. 4,236,382.

Methods used in these processes to accomplish the S/L/V transformations are as followed:

1. Rotating Sprayer Method;
2. Stationary Sprayer Method;
3. Spraying on Rotating Basket Method;
4. Overflow Tube Method The VFVC, VFEA, AFVC, VFMPT and VFPIM Processes use the rotating sprayer method; the VFVF process used the stationary sprayer method; the VFSC Process uses the spraying on rotating basket method; the VFVA Process uses the overflow tube method.

The rotating sprayer method used in VFVC Process uses an agitator that consists of four pipes arranged in a scoop-type fashion to scoop solution from a liquid pool and throw it on the freezer walls, and at the same time agitate the pool. In the bottom of the freezer are baffles that dampen the vortex formed by the rotating agitator. Water vaporizes from the surfaces of the spray and the liquid film on the wall to cause simultaneous freezing. The methods used in VFEA, AFVC, VFMPT and VFPIM Processes are similar.

The stationary sprayer method is used in the VFVF Process. In the process, a batch evaporative desalination method and apparatus having a pair of similar systems for substantially continuous output are described. Each system has three evacuated chambers in vapor communication with each other. In the first chamber, precooled seawater is sprayed for partial vaporization and consequent formation of ice crystals as latent heat is removed from the seawater. Ice crystals are permitted to accumulate in the first chamber and water vapor flows to a second chamber in which refrigeration coils, preferably cooled by cold natural gas, maintained at a temperature below the triple point on that ice condenses thereon. After a selected interval, spraying of precooled seawater into the first chamber and refrigeration in the second chamber are stopped. Warmer seawater is them sprayed into a third chamber also maintained low pressure so that a portion of the water vaporizes but without formation of ice in the brine. The water vapor flows to the first and second chambers and condenses on the ice therein to transfer intent heat for melting the ice. Fresh water is withdrawn from the second chamber. Fresh water in the first chamber percolates through the ice crystals for washing and when residual brine is removed, fresh water is withdrawn from this chamber also.

The spraying on rotating basket method is used in the VFSC Process. The process is a batch evaporative freezing process in which saline water is sprayed into a rotating cylindrical basket at a pressure below the triple point pressure. Continuous removal of vapor results in the formation of an annular ice-brine semi-solid layer on the lateral surface of the basket. The brine is removed by washing and the residual ice is melted. The optimum design requires that the freezing, washing and melting operations be of equal duration. Therefore, the optimum plant consists of three modules, in each of which the freezing, washing and melting operations occur in succession and out-of-phase with the other two. The heat removed by evaporative freezing in one module is used to melt the washed ice in another module.

The overflow tube method is used in the VFVA Process. In this process, the S/L/V transformation operation is conducted by pumping brine through standing tubes and allow the brine to overflow along the outer walls of the standing tubes. Simultaneous vaporization and freezing take place from the overflowing liquid film.

2B. Primary Refrigerant Eutectic Freezing (PREUF) Process

The Primary Refrigerant Eutectic Freezing (PREUF) Process has been introduced by Chen-Yen Cheng and Sing-Wang Cheng and is described in U.S. Pat. No. 4,654,064. The process is used to separate mixtures containing at least one volatile component and two or more crystal-forming components. Heat is removed from a eutectic mixture at near its eutectic temperature by inducing vaporization of a portion of the eutectic mixture at its eutectic temperature. The vapor is liquefied by a two-step process—(a) mixed condensation/desublimation and (b) desublimate-melting. Co-crystallizatiuon of different components in the same zone of the freezer or selective crystallization of different components in different sub-zones of the freezer are possible with several different flow schematics possible. Separation of crystals of different components formed in co-crystallization in the same liquid pool followed by separation of individual component crystals from adhering liquids give purified products. Separation of crystals of different components is not required where selective crystallization is effective.

Two methods of conduction S/L/V transformations are described in the patent. The first method is to apply a film of liquid on a vertical plate and allow the liquid to partially vaporized and solidify; the second method is to add a mass of liquid on a rotating horizontal tray to thereby partially vaporize and solidify the liquid.

2C. Wet and Dry Distillative Freezing (DF) Process

Wet and Dry Distillative Freezing Process has been introduced by Chen-Yen Cheng and Sing-Wang Cheng and is described in U.S. Pat. No. 4,578,093. A wet and dry distillative freezing process comprises (a) a first step of transforming a liquid feed mixture into a first solid-liquid mixture, denoted as $K_1$ mixture, by either a conventional freezing operation or a wet distillative freezing operation, (b) a second step of washing the $K_1$ mixture with a wash liquid to thereby form a second solid-liquid mixture, denoted as $K_2$ mixture, and an impure liquid $L_2$, and (c) a third step of subjecting the $K_2$ mixture to a dry distillative freezing opertion to thereby form a mass of refined solid phase, denoted as $S_3$, and a low pressure vapor $V_1$. Various wash liquids may be used in the crystal washing step. It is important to note that the wash liquid used does not have to be a pure liquid but may contain some voltaile impurities. This is so, because the volatile impurities in the wash liquid will be taken up in the $K_2$ mixture and will be removed in the dry distillative freezing step. Convenient wash liquids to use are (a) a mass of the feed liquid, (b) a mass of the condensate liquid, and (c) a part of the product liquid. One may also use a solution containing the crystallizing component and a selected volatile component as a wash liquid. In this process, the wet distillative freezing operation, which is an S/L/V transformation is accomplished by using a set of rotating disks rotated by a shaft.

These disks are partially submerged into liquid and are scraped by stationary blades.

2D. Vacuum Crystallization

Vacuum crystallization is a very well known unit operation and is described in most books on unit operations. An extensive description is available in Kirk and Othmer: "Encyclopedia of Chemical Technology." In this process, the S/L/V transformation causes formation of a vapor stream and a mass of solute crystals. Solution is heated mostly in a long vertical tube heat exchanger and the heated solution is flash vaporized in a vacuum chamber connected to the top of the vertical tubes.

BRIEF DESCRIPTION OF THE INVENTION

The methods and apparatuses of the present invention are used in conducting a solid-liquid-vapor transformation operation (S/L/V transformation), which refers to simultaneous vaporization and solidification of a mass of liquid, to thereby form a first vapor stream and a mass of solid. The mass of solid formed may be a mass of solvent crystals, a mass of solute crystals, or a mixed mass of solvent and solute crystals. They are useful in a vacuum freezing process, a eutetic freezing process, a wet distillative freezing process, and a vacuum crystallization process.

In a process of the present invention, an S/L/V transformation is conducted in a longitudinal processing zone having a first end and a second end. There are two or more intermeshing longitudinal and rotatable processing units laying in the longitudinal direction of the processing zone. A processing unit may be a scre unit that comprises a shaft and multitude of screw elements attached to the screw; a processing unit may also be a disk assembly that comprises a shaft and multitude of radial disks attached to the shaft. A screw element or a radial disk is referred to as a processing element. A processing element has a small cross section in the longitudinal direction and provides a large surface area for an S/L/V transformation operation to take place. Therefore, there are two or more intermeshing screw units or disk assemblies in the processing zone.

In operation, a mass of liquid derived from the feed is introduced on the surfce of each processing element, and the pressure in the processing zone is maintained under a pressure that is somewhat lower than the solid-liquid-vapor equilibrium pressure. The liquid may be introduced on the surface of the processing elements by spraying or by partially submerging the elements into a pool of liquid derived from the feed. The liquid on the processing elements thereby undergoes simultaneous vaporization and solidification to form a first vapor stream and a mass of solid. The solid formed may be a mass of solvent crystals, or a mass of solute crystals, or a mixed solid mass of solute and solvent crystals. The surfaces of the processing elements are textured or so constructed to retain a condensed mass that comprises a mass of solid and mass of liquid. It is noted that the liquid on a processing element tends to drain and flows relative to the solid retained on the element. This flow of liquid on the element increases mass and heat transfer and provide refreshed liquid surface to enhance the S/L/V transformation.

Due to the intermeshing of the processing units, the solid formed on the processing elements is taken off of the elements; due to the action of the screw, the mass of crystals dislodged from the processing elements is transported in the direction from the first end to the second end. At the second end of the processing zone, the screws are enclosed in a shroud. The solid-liquid mixture in the shrouded region is pressurized by the action of the enclosed screws and is discharged from the processing zone.

The screw elements on a processing unit may form a single lead screw or a multiple lead screw. A multiple lead screw comprises several screws placed at staggered positions. For instance, four screws with 6 inch pitch may be placed at 90 apart to form a multiple-lead screws that are separated by 1.5 inch in the longitudinal direction. A multiple lead screw transports crystal at a higher linear velocity in the longitudinal direction. When the first vapor formed is cooled without a substantial pressurization, one of the following takes place:
  (a) a simple desublimation;
  (b) a mixed condensation;
  (c) a simple condensation When the feed is a pure solvent or a solution containing non-volatile solute or solutes, the first vapor formed is a pure solvent vapor. When such a vapor is cooled, it desublimes to form solvent solid. When the feed is a solution and the solute is more volatile than the solvent, and the condensing temperature is within a proper range, the first vapor formed can be condensed into a liquid phase. In other cases, the first vapor condenses partly into liquid and partly into solid. In the first and third cases, the first vapor can be transformed into a liquid mass by a two stage liquefaction operation as follows:
  (a) the first vapor is cooled to form a condensed mass which may be mass of solvent solid or a mixed mass of solid and liquid;
  (b) the solid part of the condensed mass is then melted so that the condensed mass becomes a liquid mass.

A processing system, referred to as a mini-quad unit that comprises a vacuum vessel, two or more longitudinal and rotary processing units, such as screw processing units, four two-stage vapor liquefiers, is also introduced.

The use of the methods and apparatuses of the present invention leads to the following advantages:
  (a) Enhanced heat and mass tranfer rates;
  (b) Adoptable to multistage operation
  (c) Low work input required in conducting the S/L/V transformation;
  (d) Large size crystals produced;
  (f) Facilitate transport of solvent and solute crystals

BRIEF DESCRIPTION OF DRAWINGS

FIG. 9 illustrates a two intermeshing screw system and illustrates how the system can be used in processing an aqueous feed solution by VFMPT and Wet DF Processes.

FIG. 10 illustrates how the system can be used in processing a non-aqueous feed solution by VFMPT and Wet DF Processes.

FIG. 11 illustrates a two intermeshing screw system and illustrates how the system can be used in processing an aqueous feed solution by PREUF Process.

FIG. 12 illustrates a two intermeshing screw system and illustrates how the system can be used in processing a non-aqueous feed solution by VFMPT and Wet DF Processes and processing an aqueous feed solution by PREUF Process.

FIG. 13 illustrates a two intermeshing screw system with double jacketed heating arrangement and illustrates how the system can be used in processing an aqueous or non-aqueous feed solution by a vacuum crystallization process.

FIG. 14 illustrates an intermeshing double screw system with a shrouded region to enclose a part of the two screw processing units to thereby pressurizes a slush formed in the system and facilitate discharging the slush from the processing zone.

FIG. 15 illustrates a processing element, a screw element or a disk element, that has been micro-textured by a sand blasting operation to enhance retaining of liquid and solid on the element surface.

FIG. 16a and 16b illustrates a processing element, a screw element or a disk element, provided with macro-textures by pressing or molding operations to enhance retaining liquid and solid on the processing element.

PREFERRED EMBODIMENT OF THE INVENTION

The methods and apparatuses of the present invention are used in conducting a solid-liquid-vapor transformation operation (S/L/V transformation), which refers to simultaneous vaporization and solidification of a mass of liquid to thereby form a first vapor stream and a mass of solid. The mass of solid formed may be a mass of solvent crystals, a mass of solute crystals, or a mixed mass of solvent and solute crystals. They are useful in a vacuum freezing process, a eutetic freezing process, a wet distillative freezing process, and a vacuum crystallization process. In the S/L/V transformation steps of all of these processes there are requirements for:

(1) providing liquid/vapor interface area for vaporization and solidification to take place,
(2) dislodging of crystals from the surface on which the solid is formed,
(3) enhancement of heat and mass transfers,
(4) transport of solid within the processing zone, and
(5) discharging solid from the processing zone.

In a process of the present invention, an S/L/V transformation is conducted in a longitudinal processing zone having a first end and a second end. There are two or more intermeshing longitudinal and rotatable processing units laying in the longitudinal direction of the processing zone. A processing unit may be a screw unit that comprises a shaft and multitude of screw elements attached to the screw; a processing unit may also be a disk unit that comprises a shaft and multitude of disk elements attached to the shaft. A screw element or a radial disk is referred to as a processing element. A processing element has a small cross section in the longitudinal direction and provides a large surface area for an S/L/V transformation operation to take place. Therefore, there are two or more intermeshing screw units or disk assemblies in the processing zone.

The heart of the apparatus used is two or more intermeshing processing units, which may be screw processing units or radial disk processing units. The structures of screw units are illustrated by FIGS. 1 through 4; the structures of the disk units are illustrated by FIGS. 5 through 8.

Figure 1:
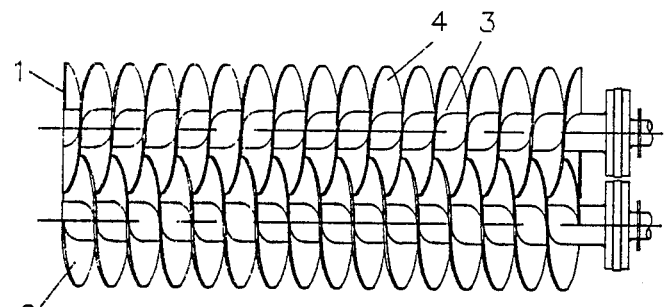
FIG. 1 illustrates a major part of a solid-liquid-vapor multiple phase processing system using two intermeshing screws.
Figure 2:
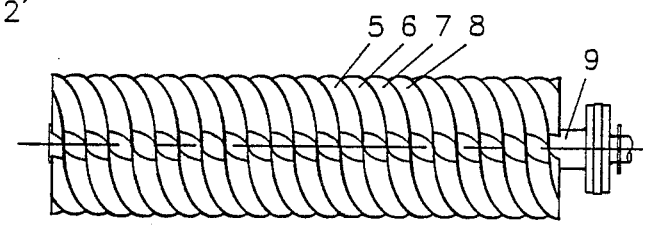
FIG. 2 illustrate a screw processing unit with multiple leads.

FIG. 1 illustrates a horizontal view of two intermeshing and counter rotating screw type processing units 1, 2. Each unit has a rotating shaft 3 and screw processing element 4. The screw processing element has a small cross section in the shaft direction and provides a large surface area for retaining solid and liquid and provided liquid-vapor interface needed for conducting S/L/V transformation. It is seen that the two shafts are so positioned that the two sets of screw processing elements intermeshed in the direction perpendicular to the shaft direction and are spaced by a short distance in the shaft direction.

One may use a single lead screw or a multiple lead screw. A multiple lead screw has two or more screws 5, 6, 7, 8 attached to a common shaft 9 and the screws are laid at staggered angular positions around the shaft. With a multiple lead approach, one can use several screws having a large pitch and provide a large surface area in a given space. Use scres with a large pitch enhances transport of solid in the procjessing zone.

Figure 3:
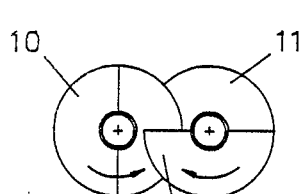
FIG. 3 illustrates a cross section of a double screw assembly and shows how two intermeshing screws can be used in conducting an S/L/V transformation.
Figure 4:
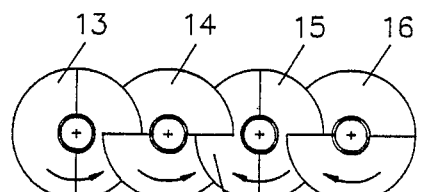
FIG. 4 illustrates a cross section of a four screw assembly and show how four intermeshing screws can be used in conducting an S/L/V transformation.

Rotations of the screw units can either be co-rotational or counter-rotational. FIG. 3 illustrates a system with two screws 10, 11 that are rotated in counter directions. In this mode of rotation, slush in the intermeshing region 12 tends to be pressurized. FIG. 4 illustrates a system with four screw units 13, 14, 15, 16. It shows that screw units 13, 14 are rotated counter-clock wise and screw units 15, 16 are rotated clockwise. Screw units 13,1 4 are co-rotational; screw units 15, 16 are co-rotational; screw units 14, 15 are counter rotational. Co-rotational motions of screws 13 1nd 14 and co-rotational motions of screws 16 and 15 tend to transport crystals toward the center and the counter rotation of screw tend to pressurizes the slush in the intermeshing region 17.

Figure 5:
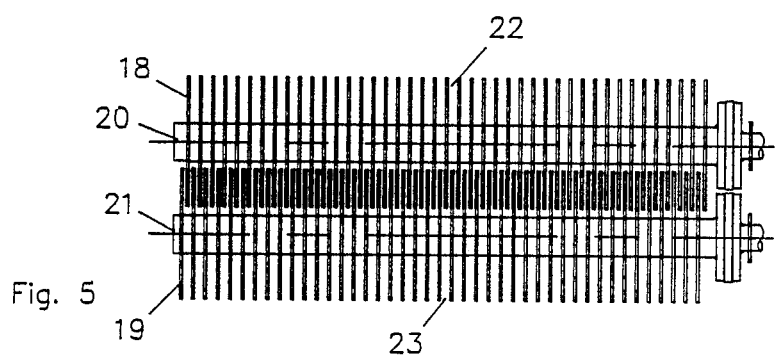
FIG. 5 illustrates a major part of a solid-liquid-vapor multiple phase processing system using two intermeshing radial disk processing units.
Figure 6:
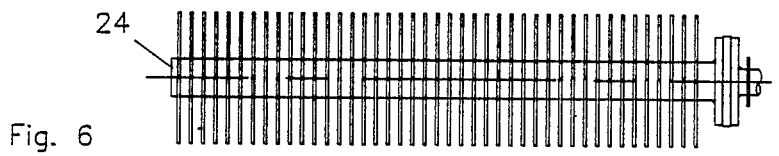
FIG. 6 shows a vertical view of on radial disk processing unit.
Figure 7:
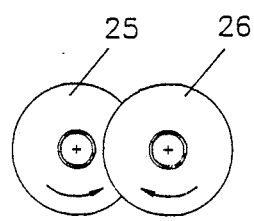
FIG. 7 illustrates a cross section of two intermeshing radial disk processing units and shows how the two processing units can be used in conducting an S/L/V transformation.
Figure 8:
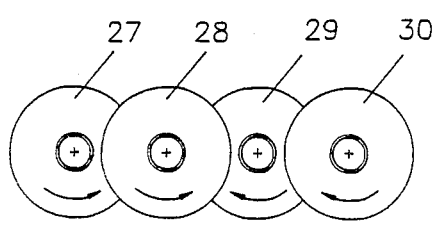
FIG. 8 illustrates a cross section of four intermeshing radial disk processing units and shows how the four processing units can be used in conducting an S/L/V transformation.

FIG. 5 illustrates a horizontal view of a system with two radial disk processing units 18, 19. Each unit has a shaft 20, 21 and disk elements 22, 23. The two shafts are so positioned that the elements of the two units intermesh in the direction perpendicular to the shaft and are spaced by short distances in the shaft direction. The surfaces of the disks are the processing surfaces that retain liquid and solid and the liquid retained on the surface undergoes simultaneous vaporization and solidification opoerations. FIG. 6 shows a vertical view of a radial disk processing unit 24. FIG. 7 illustrates counter rotation of two neighboring units 25, 26. By the counter rotation, solid on the processing surfaces is removed from the surfaces. This removal may be caused by scraping operation or by fluid motion caused by the counter rotation. FIG. 8 illustrates a system with four disk processing units 27, 28, 29, 30. Each of the four units can either be rotated clockwise or counter clockwise.

FIG. 9 illustrates a system with two screw units used in processing an aqueous solution by VFMPT or Wet DF Process. It has a containing vessel 31 enclosing the processing zone, two screw units 32, 33 and a pool of liquid 34 derived from the feed. The screws are shown to be partially submerged in the liquid. When the screw units are rotated and the pressure in the processing zone is brought to a pressure somewhat lower than the vapor pressure of the solution at its freezing temperature, S/L/V transformation takes place near liquid-vapor interfaces. The S/L/V transforamtion takes place at the pool surface and at the screw surfaces. The liquid on the processing surface is thereby transformed into a first vapor and a mass of ice.

The ice so formed and remaining liquid form a condensed mass that is retained on the screw surface. The liquid on the surface flows relative to the solid, exposing new liquid surface. This flow of liquid on the surface enhances mass transfer and heat transfer rates. Compared with a spraying method, the methods of the present invention has the following advantages:

(1) liquid on the processing surface undergoes S/L/V transformation for an extended period of time and the liquid surface refreshes itself.
(2) the work input required to provide a unit liquid/-vapor interfacial area is small
(3) high heat and mass transfer rates because of flow of liquid on the processing surfaces.

The ice formed on the processing surfaces is dislodged from the surface by the rotational motion of the units and floats on the pool surface. The floating ice and liquid forms a slush 34. The slush is pushed in the processing zone in the direction shown by the action of the screws and discharged from the processing zone.

FIG. 10 illustrates a system with two screw units used in processing a non-aqueous feed by VFMPT or Wet DF Process. The construction and operation of this system are similar to those described for the system of FIG. 9, except that the solid formed in the S/L/V transformation is denser than the liquid and therefore settles to the bottom of the liquid pool forming a slush 35. The slush is pushed forward by the action of the screws.

FIG. 11 illustrates a system with two screw units used in processing an aqueous solution by the PREUF Process. The construction and operation of this system are similar to those described for the system of FIG. 9, except for the following differences: The solid formed in the S/L/V transformation comprises a mass of solvent crystals (ice) and a mass of solute crystals. The ice crystals and liquid form a first slush 36 which floats on the pool surface; the solute crystals and liquid form a second slush 37 which settles to the bottom of the pool. Both the first slush and the second slush are transported in the processing zone by the action of the screw units.

FIG. 12 illustrates another system with two processing screw unit that is used in processing a non-aqueous solution by VFMPT or Wet DF Process, or in processing an aqueous solution by PREUF Process. In this system, there are two screw processing units 38, 39, and an additional conveying screws 40.

When the system of FIG. 12 is used in processing a non-aqueous solution by VFMPT or Wet DF Process, the operation is similar to that described for the system of FIG. 10. In this system, however, the solvent crystals settle in the pool 41 and form a slush 42 and the slush is transported in the processing zone by the conveying screw 40.

When the system of FIG. 12 is used in processing an aqueous solution by the PREUF Process, the operation is similar to that described for the system of FIG. 11. In this system, the first slush mass containing ice crystals in transported by the two processing screw units 38 and 39, and the second slush mass containing the solute crystals is transported by the conveying screw 40.

FIG. 13 illustrates a double screw processing system that can be used in conducting a vacuum crystallization operation. The system is similar to the system of FIG. 9, except that a heating jacket 43 has been added. In the operation, the solution is heated by a heating medium in the jacketed region, the solution is added to the screw elements, and the solution undergoes an S/L/V transformation to form a slush 44, which is transported and discharged by the rotating motion of the screw units. The heating is required because unlike vacuum freezing, distillative freezing and eutectic freezing, the latent heat of freezing released in the formation of the solute crystals is not sufficient to supply all the latent heat of vaporizing the volatile components.

FIG. 14 illustrates a double screw processing system having a shroud 45 enclosing the discharge end of the screws 46, 47. The slush 48 formed in the processing zone of the system has to be discharged from the zone. Pressurizing the slush facilitates the discharging operation. Enclosing the end of the screws with a shroud causes the slush to be pressurized and thus facilitate the discharging operation.

By referring to systems illustrated by FIG. 9 through 14, S/L/V transformation using screw processing units have been described. S/L/V transformation using systems with radial disk units are similar except transport of slushes has to be accomplished by a separate conveying means.

For an efficient operation, it is important that proper amounts of liquid and solid are retained on the processing elements. Either micro-texturing or macro-texturing or both helps increase the amounts of solid and liquid retained on the element. FIG. 15 illustrates a processing element, a screw element or a disk element 49, that has been micro-textured 50 by a sand blasting operation to enhance retaining of liquid and solid on the element surface. FIG. 16a and 16b illustrates a processing element, a screw element or a disk element 51, provided with macro-textures 52 by pressing or molding operations to enhance retaining liquid and solid on the processing element.

When a film of solution is subjected to evaporative freezing, the exposed surfce of the film experiences an increase in concentration of the minor component(s) due to the removal of solvent by crystallization. The increase in concentration of the minor component causes the freezing point as well as the vapor pressure of the film to decrease. Since the driving force for evaporative freezing is the difference between the vapor pressure of the liquid in the film and the actual pressure in the vapor space, a decrease in the vapor pressure of the film caused by an increase in the minor component concentration causes the driving force for further evaporative freezing to decrease. Therefore, the freezing rate is decreased.

This decrease in freezing rate can be minimized if the exposed liquid layer is mixed with the unexposed liquid layer which is lower in concentration of the minor components. Such an effect can also be produced by texturing the screw flighting or the disk elements. The micro-texturing, 50, illustrated in FIG. 15 and the macro-texturing, 52, illustrated in FIG. 16a and FIG. 16b cause the liquid layers on the elements to mix as the elements are rotated. This mixing tends to decrease the concentration of the minor component on the exposed surface of the liquid film and thus increases the driving force for evaporative freezing to take place.

Figure 17A:
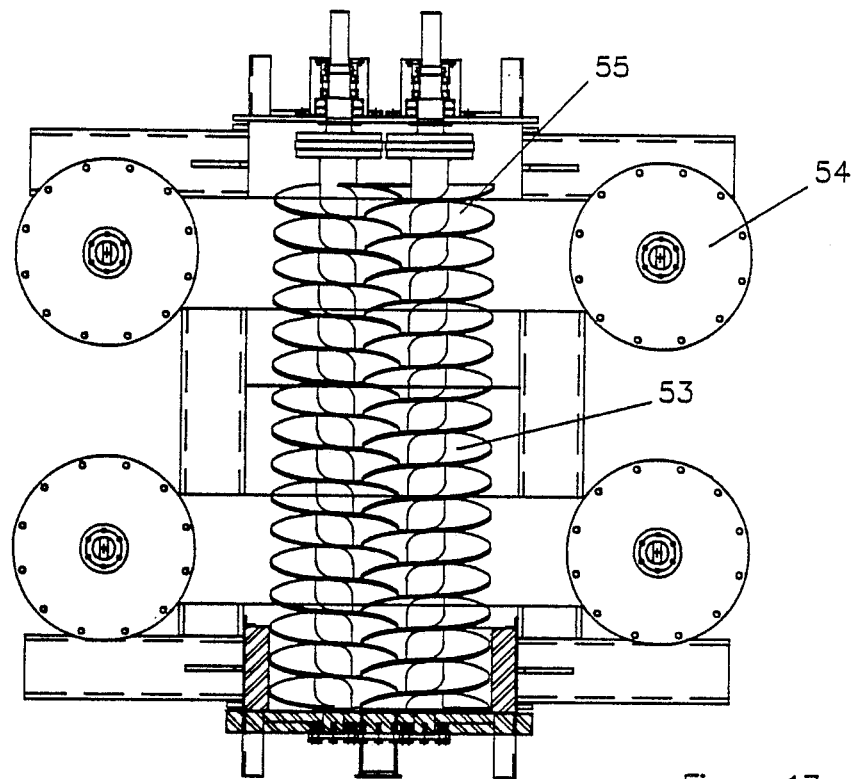
FIG. 17a and 17b illustrates an integrated system, referred to as a mini-quad unit. The system illustrated comprises a horizontal vacuum vessel enclosing a longitudinal processing zone, two intermeshing screw processing units and four liquefiers for the first vapor generated in the processing zone.
Figure 17B:
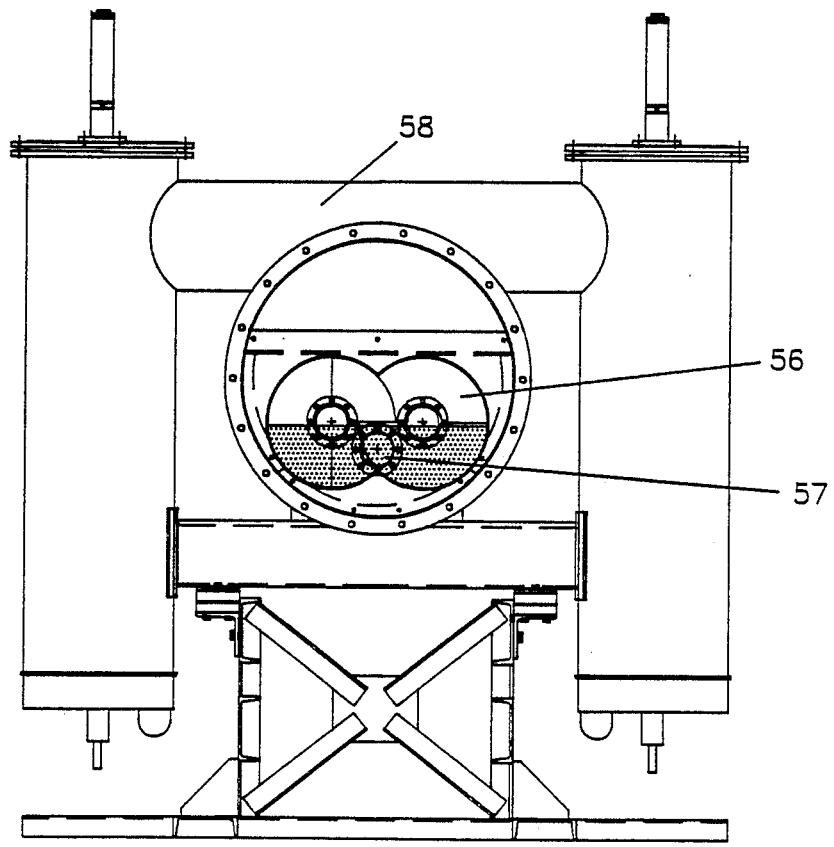

An integrated S/L/V processing and vapor liquefaction system is shown in FIGS. 17a and 17b. It consists of a horizontal vacuum evaporative freezing chamber, 53, and four vertical condenser units, 54, for liquefying the vapor. In the vacuum freezer there are a set of two twin screws, 55, which are partially submerged in the liquid pool during operation. The surfaces of the rotating twin screws which are above the liquid level, 56, provide the necessary surface area for evaporative freezing to take place. The screws also transport the crystals to the discharge port of the vacuum freezer, 57.

The four condensers are connected to the vapor space of the vacuum freezer through two horizontal passageways, 58, passing perpendicularly through the top portion of the vacuum freezer. Each passageway contains two vapor valves, one for each condenser, which control the vapor flow, either allowing or disallowing passage to the condenser. Inside each condenser is a set of heat exchangers which can be tube coils or rolled plate coils.

Multiple condensers are used because of the requirement that any of the vapor which condenses as solid must be melted. Since the melting time is much shorter than the condensation time, three condensers are in the condensing mode while one condenser is in the melting mode at a given time.

Each condenser has a hot liquid line which provides the heat required to melt any solid condensate. When the hot liquid line is opened, the hot liquid flows in the condenser and immediately flash vaporizes. The vapor so formed is at a temperature and pressure high enough to melt the desublimate by condensing on it. Each condenser also has a valve which shuts off the refrigerant flow during the melting period of the condenser. In addition, each condenser is provided with a vacuum line which removes any air leakage into the equipment as well as any air dissolved in the feed. At the discharge end of the freezer, the slurry formed is pumped through a port, 57, to the next processing zone.

The controls required for operation of the integrated evaporative freezing and vapor liquefaction unit are mainly valving cycles for vapor entrance into the condensers, the refrigerant lines, the hot liquid inlet lines, the melt drainage lines and the inert gas removal lines.

The timing cycles and signals are easily coordinated by a programmable logic controller for a single condenser. When the sequence is finished for one condenser, the controller moves on to the next condenser with the same sequence.

What we claim are as follows:

1. A process of subjecting a feed that is at least mostly in the liquid phase and contains a volatile major component to simultaneous vaporization and solidification operations, to thereby form a first vapor and a first condensed mass that contains a mass of solid, that is characterized by processing the feed in a longitudinal processing zone having a first end and a second and having at least two longitudinal rotatable processing units, each unit being rotatable around an axis and the axes of the processing units being substantially parallel to each other and are laid along the longitudinal direction of the processing zone, each processing unit having a multitude of rotatable radial processing elements that are laid and spaced along the axis of the unit, each processing element having a small cross section in the direction parallel to the axis and providing a processing surface, and the axes of two neighboring processing units being so positioned that the two sets of processing elements intermesh with each other, and the process comprising:

(a) a first step of maintaining the processing zone under a pressure that is lower than the solid-liquid-vapor multiple phase equilibrium pressure;

(b) a second step of rotating the longitudinal processing units to thereby rotate the processing elements (c) a third step of adding a mass of liquid derived from the feed on the processing surfaces of the processing elements;

(d) a fourth step of subjecting the liquid on each processing element to simultaneous vaporization and solidification operations so that at least a major part of the latent heat released in the solidification operation is utilized in supplying the latent heat of the vaporization operation and thereby form a first vapor and a first condensed mass containing a mass of solid;

(e) a fifth step of removing a mass of solid from each processing element by the rotational motion of the intermeshing processing elements on two neighboring processing units;

(f) a sixth step of transporting the solid removed from the processing elements in the processing zone in the direction from the first end toward the second end, (g) a seventh step of discharging the solid from the processing zone 2. A process of claim 1, wherein the third step of adding a mass of feed on the processing elements is accomplished by partially submerging the processing elements into a pool of liquid derived from the feed.

3. A process of claim 1, wherein the third step of adding a mass of feed on the processing elements is accomplished by spraying a mass of liquid derived from the feed on the elements.

4. A process of claim 1, which further comprises an eighth step of liquefying the first vapor formed in the fourth step by a first substep of cooling the first vapor without a substantial pressurization to thereby form a second condensed mass containing a solid mass of the major component and a second substrip of melting the solid mass in the second condensed mass.

5. A process of claim 1, wherein the processing elements are screw elements.

6. A process of claim 5, wherein the processing elements on a processing unit comprises two or more sets of screw elements forming multiple leads.

7. A process of claim 5, wherein the sixth step of transporting solid and the seventh step of discharging the solid are accomplished by the rotational motion of the intermeshing screw elements.

8. A process of claim 5, wherein the major component of the feed is water and the solid formed in the fourth step is ice.

9. A process of claim 5, wherein the feed is an aqueous solution containing at least one solute and the solid formed in the fourth step contains at least one of the solutes.

10. A process of claim 5, wherein the feed is an aqueous solution containing at least one solute and the solid formed in the fourth step is a mixed solid mass containing crystals of ice and crystals of one of the solutes.

11. A process of claim 5, wherein the feed is a non-aqueous solution containing a non-aqueous solvent and one or more solutes and the solid formed in the fourth step is a mass of solvent solid.

12. A process of claim 5, wherein the feed is a non-aqueous solvent and one or more solutes and the solid formed in the fourth step contains at least one of the solutes.

13. A process of claim 5, wherein the feed is a non-aqueous solution containing a non-aqueous solvent and one or more solutions and the solid formed in the fourth step contains crystals of the solvent and crystals of at least one of the solutes.

14. A process of claim 5, wherein the major component of the feed is water and the first vapor formed in the fourth step is substantially pure water.

15. A process of claim 5, wherein the feed is an aqueous solution containing at least one volatile solute and the first vapor formed in the fourth step is a vapor mixture containing water and the volatile solute.

16. A process of claim 5, wherein the feed is a non-aqueous solution containing a volatile non-aqeous major component and the first vapor formed in the fourth step is substantially pure major component.

17. A process of claim 5, wherein the feed is a non-aqueous solution containing a volatile non-aqueous major component and at least one volatile non-aqueous minor component and the first vapor formed in the fourth step is a vapor mixture containing the major and minor volatile components.

18. A process of claim 1, wherein the processing elements of a processing unit are radial disk elements.

19. A process of claim 18, wherein the major component of the feed is water and the solid formed in the fourth step is ice.

20. A process of claim 18, wherein the feed is an aqueous solution containing at least a solute and the solid formed in the fourth step contains at least one of the solutes.

21. A process of claim 18, wherein the feed is an aqueous solution containing at least a solute and the solid formed in the fourth step is a mixed solid mass containing crystals of ice and crystals of one of the solutes.

22. A process of claim 18, wherein the feed is a non-aqueous solution containing a non-aqueous solvent and one or more solutes and the solid formed in the fourth step is a mass of solvent solid.

23. A process of claim 18, wherein the feed is a non-aqueous solution containing a non-aqueous solvent and one or more solutes and the solid formed in the fourth step contains at least one of the solutes.

24. A process of claim 18, wherein the feed is a non-aqueous solution containing a non-aqueous solvent and one or more solutes and the solid formed in the fourth step contains cyrstals of the solvent and crystals of at least one of the solutes.

25. A process of claim 18, wherein the major component of the feed is water and the first vapor formed in the fourth step is substantially pure water.

26. A process of claim 18, wherein the feed is an aqueous solution containing at least one volatile solute and the first vapor formed in the fourth step is a vapor mixture containing water and the volatile solute.

27. A process of claim 18, wherein the feed is a non-aqueous solution containing a volatile non-aqueous major component and the first vapor formed in the fourth step is substantially pure major component.

28. A process of claim 18, wherein the feed is a non-aqueous solution containing a volatile non-aqueous major component and at least one volatile non-aqueous minor component and the first vapor formed in the fourth step is a vapor mixture containing the major and minor volatile components.

29. An apparatus for subjecting a feed that is mostly in the liquid phase and contains a volatile major component, designated as the solvent, to simultaneous vaporization and solidification operations to thereby form a first vapor and a condensed mass that contains a mass of solid that comprises:
   (a) a longitudinal vessel enclosing a longitudinal processing zone having a first end and a second end,
   (b) two or more longitudinal rotatable processing units, each unit having a rotatable shaft and a multitude of radial processing elements attached to the shaft, each processing element having a processing surface and being thin in the shaft direction, the shafts of two neighboring processing units being so positioned that the two sets of processing elements intermesh in the direction perpendicular to the shaft direction,
   (c) a first means of rotating the longitudinal processing units and synchronizing the rotations of the longitudinal units,
   (d) a second means of adding a mass of liquid derived from the feed to the processing elements,
   (e) a third means of removing vapor from the processing zone and maintaining the processing zone under a proper pressure,
   (f) a fourth means of transporting solid in the processing zone,
   (g) a fifth means of discharging solid from the processing zone, so that upon addition of a feed in the processing zone the following operational steps take place in the processing zone:
   a. Step 1: the longitudinal processing units are rotated,
   b. Step 2: the processing zone is maintained under a pressure that is somewhat lower than the equilibrium solid-liquid-vapor pressure,
   c. Step 3: a liquid derived from the feed is added to the processing elements,
   d. Step 4: the liquid on each processing element is subjected to simultaneous vaporization and solidification operations to thereby form a first vapor and a first condensed mass containing a mass of solid.
   e. Step 5: a mass of solid and a mass of liquid are retained on each processing element,
   f. Step 6: a part of the solid formed on the processing elements is removed from the elements by the rotational motions of the intermeshing processing elements, g. Step 7: the solid removed from the processing elements is transported within the processing zone, h. Step 8: the solid formed is discharged from the processing zone.

30. An apparatus of claim 29, wherein the second menas, of adding a mass of liquid derived from the feed to the processing elements, is provided by partially submerging the processing elements into a pool of liquid derived from the feed.

31. An apparatus of claim 29, wherein the second means, of adding a mass of liquid derived from the feed to the processing elements, is provided by one or more spraying means.

32. An apparatus of claim 29, wherein the third means, of removing vapor from the processing zone, is provided by one or more condensers in which the vapor is first condensed without a substantial pressurization and then any solid portions of the condensate are melted.

33. An apparatus of any of claims 29, 30, 31 and 32, wherein the processing elements are screw elements.

34. An apparatus of claim 33, wherein the fourth means, of transporting solid in the processing zone, is provided by the screw elements and step 7, of transporting the solid in the processing zone, is accomplished by the rotational motion of the screw processing elements.

35. An apparatus of claim 33, which comprises an additional sixth means consisting of separating the first condensed mass formed in Step 4 into a first sub-mass containing solvent crystals and a second sub-mass containing solute crystals whereby the sixth means is provided by the processing screw elements and the separation is accomplished by the rotary motion of the processing elements.

36. An apparatus of any of claims 29, 30, 31, and 32, wherein the processing elements are radial disk elements.

* * * * *